United States Patent
Smith

(10) Patent No.: US 10,165,893 B2
(45) Date of Patent: Jan. 1, 2019

(54) COOKWARE ITEM WITH SPOON RECEIVING RECESS

(71) Applicant: Alice Gail Smith, Arlington, TX (US)

(72) Inventor: Alice Gail Smith, Arlington, TX (US)

( * ) Notice: Subject to any disclaimer, the term of this patent is extended or adjusted under 35 U.S.C. 154(b) by 341 days.

(21) Appl. No.: 13/742,028

(22) Filed: Jan. 15, 2013

(65) Prior Publication Data

US 2014/0197186 A1     Jul. 17, 2014

(51) Int. Cl.
| | | |
|---|---|---|
| *A47G 21/14* | (2006.01) | |
| *A47J 36/00* | (2006.01) | |
| *A47J 45/06* | (2006.01) | |

(52) U.S. Cl.
CPC ............... *A47J 36/00* (2013.01); *A47J 45/06* (2013.01)

(58) Field of Classification Search
CPC ..... A47J 43/287; B65D 51/246; B65D 25/20; B65D 83/303; A47L 13/58
USPC ......... 220/694, 735, 360, 573.1, 574.1, 627, 220/696, 759; 248/110, 113, 176.2, 376; D7/354, 360, 361, 395, 401.2, 505
See application file for complete search history.

(56) References Cited

U.S. PATENT DOCUMENTS

| | | | | |
|---|---|---|---|---|
| 269,054 | A * | 12/1882 | Hemsteger | A47G 19/02 220/574 |
| 315,989 | A * | 4/1885 | Ziph | A47J 36/08 222/467 |
| 517,293 | A * | 3/1894 | Powell | B65D 51/246 220/735 |
| 1,125,585 | A * | 1/1915 | Menger | B65D 51/246 220/735 |
| 1,237,504 | A * | 8/1917 | Graham | A47G 21/145 248/213.2 |
| 1,928,995 | A * | 10/1933 | De Biasi | A47J 36/12 220/735 |
| 2,034,940 | A | 3/1936 | Butler | |
| 5,924,592 | A | 7/1999 | Hieronymus | |
| 6,032,822 | A | 3/2000 | Munari | |
| 6,948,626 | B1 * | 9/2005 | Duncan | A47J 47/16 211/70.7 |
| 7,600,654 | B2 | 10/2009 | Kutsch et al. | |
| 2007/0210094 | A1 | 9/2007 | Kutsch et al. | |
| 2007/0289981 | A1 | 12/2007 | Shaw | |

* cited by examiner

*Primary Examiner* — Fenn C Mathew
*Assistant Examiner* — Cynthia Collado
(74) *Attorney, Agent, or Firm* — Whitaker Chalk Swindle & Schwartz PLLC; Charles Gunter

(57) ABSTRACT

Cookware containers are provided with a handle member which also serves as a support to rest a utensil during cooking. Particularly, the spoon supporting handle member is afixed to the cooking container in a laterally aligned direction, rather than the normal perpendicular configuration with respect to a top opening of the container. The container can support a cooking utensil on the spoon supporting handle without having to be moved about on a stove top to avoid burners or the handles of other pots or pans.

1 Claim, 5 Drawing Sheets

COOKWARE ITEM WITH SPOON RECEIVING RECESS

BACKGROUND OF THE INVENTION

1. Field of the Invention

The present invention relates generally to cookware items and particularly a container such as a pot, saucepan, skillet, frying pan or griddle which provides a support upon which a cooking utensil may be rested during use. More particularly, a specially arranged handle member also serves as the cooking utensil support.

2. Description of the Prior Art

There are any number of cookware sets known at the present time which feature pots, pans, saucepans, skillets and frying pans, griddles, and the like. These cookware pieces will be referred to as "cookware items" or "cookware containers" in the discussion which follows. They are typically sold as complete matching sets. Similarly, kitchen utensils such as ladles, spoons, spatulas, and forks are often sold in sets. However, there is typically no element of the cookware item design which specifically envisions the necessary working relationship with commonly used cooking utensils of this type. Yet, in the preparation and cooking of various foods, often both items of cookware and kitchen utensils are used in conjunction with one another. For example, a cook preparing foods on a stove top generally uses a pot and a spoon or ladle simultaneously. Whereas, in frying foods, a cook will often simultaneously use a frying pan or griddle and a spatula.

This disconnect between the cookware design and the requirement of using various utensils during cooking presents certain problems and inconveniences. The utensil will, of necessity, tend to collect residue from various food products. This, in turn, creates an inherent problem regarding the storage of the utensil when the utensil is still being used for the preparation of the food. For example, using a given kitchen utensil in preparing food and then placing the utensil on a counter top may cause the countertop to become unsanitary or become soiled with food or grease from the utensil. Many times, the user leaves the utensil on the stovetop, leaving behind food residue which later needs to be cleaned. In other situations, the utensils may be left balanced on the top lip of the cooking pot or pan with the food as it is being prepared, or inserted within the food being cooked in the container. Either of these situations present additional concerns because the utensil may be tipped into or even knocked out of the container, causing the utensil's contents to spill. If a hot spoon or the like is dropped, this presents both a potentially dangerous and messy situation. Also, in some situations, an appreciable amount of time can be spent searching for the kitchen utensil each time the kitchen utensil is to be repetitively used.

The present invention provides a solution to the current existing problems associated with the use of a cooking utensil during the process of food preparation, as described above.

SUMMARY OF THE INVENTION

Accordingly, it is an object of the present invention to provide an improved cookware item having a support member for utensils, as well as a removable utensil support for use with a traditional cookware item such as a pot, saucepan, dutch oven, frying pan, and the like.

The container and cookware apparatus of the invention are configured to provide a support member which the utensil may rest upon prior to use, or after the utensil has been initially used. This arrangement prevents food or food residue from getting on the surrounding cooking areas such as the stove top, countertop, floor, etc. Moreover, the particular design of the utensil holder helps to ensure that the utensil is not likely to be easily tipped over or knocked off the support, which diminishes the likelihood of accidentally spilling food on the surrounding area or being burned by hot food or a hot utensil.

In one exemplary embodiment, a cookware item is provided comprising a cookware container having a base and a surrounding vertically upstanding sidewall. The initially upward extending sidewall extends vertically upward from an outer periphery of the base to define an initially open interior space within the container and a top opening of the container. The vertical sidewall has an outer wall surface and an inner wall surface. A clasp handle is afixed to and extends outwardly from the outer wall of the container adjacent the top opening thereof and is configured to be held by a user. A support handle is afixed to the container outer wall and arranged generally opposite the clasp handle on the outer sidewall of the container. The support handle is configured to receive and support a cooking utensil while also serving as a companion handle to the clasp handle when being held by the user.

The support handle has a length, an upper support surface and an opposite lower surface. The length of the support handle is arranged in a lateral direction with respect to the sidewall of the container, rather than at a right angle thereto. The upper surface of the support handle has a utensil receiving recess formed therein. The preferred utensil receiving recess formed in the upper surface of the support handle is a spoon-shaped or canoe-shaped recess which is sized for receiving at least a portion of a cooking spoon. The utensil receiving recess can be a "double-ended" spoon receiving recess to accommodate either left or right handed users. The support handle is oriented with respect to the outer wall surface of the cookware container so as to not interfere with the handles or other parts of other pots and pans which may be used on a stovetop in conjunction with the item of cookware of the invention.

In some cases, the container has a second clasp-shaped handle located opposite the first clasp handle with the spoon support member forming a part of the second clasp handle.

In another embodiment of the invention, a combination cookware item and removable support member are provided. The combination includes a cookware container having a base and a surrounding vertically upstanding sidewall which extends vertically upward from an outer periphery of the base to a peripheral lip. The base and sidewall define an initially open interior space and a top opening of the container. The sidewall has an outer wall surface and an inner wall surface.

The container again has a first, clasp handle extending outwardly from the outer wall of the container adjacent the top opening thereof which is configured to be held by a user. In this case, the container has a traditional second, elongate handle extending outwardly from the outer wall of the container adjacent the top opening thereof, generally opposite the first, clasp handle.

A removable support member is positionable on the peripheral lip of the container, the support member being configured to receive and support a cooking utensil. The removable support member has a length, an upper support surface and an opposite lower surface. The support member also has an attachment element afixed thereto for temporarily positioning the support member on the peripheral lip of the container, whereby the length of the support member is arranged in a lateral direction with respect to the sidewall of the container, rather than at a right angle thereto. The upper surface of the support handle again has a utensil receiving recess formed therein. This recess is preferably a spoon-shaped recess for receiving at least a portion of a cooking spoon. The attachment element can assume various forms and can be, for example, an attachment clip which is used to clip the support member on the peripheral lip of the container.

These and additional advantages of the present invention will be more readily apparent in view of the following detailed description.

DETAILED DESCRIPTION OF THE INVENTION

Figure 1:
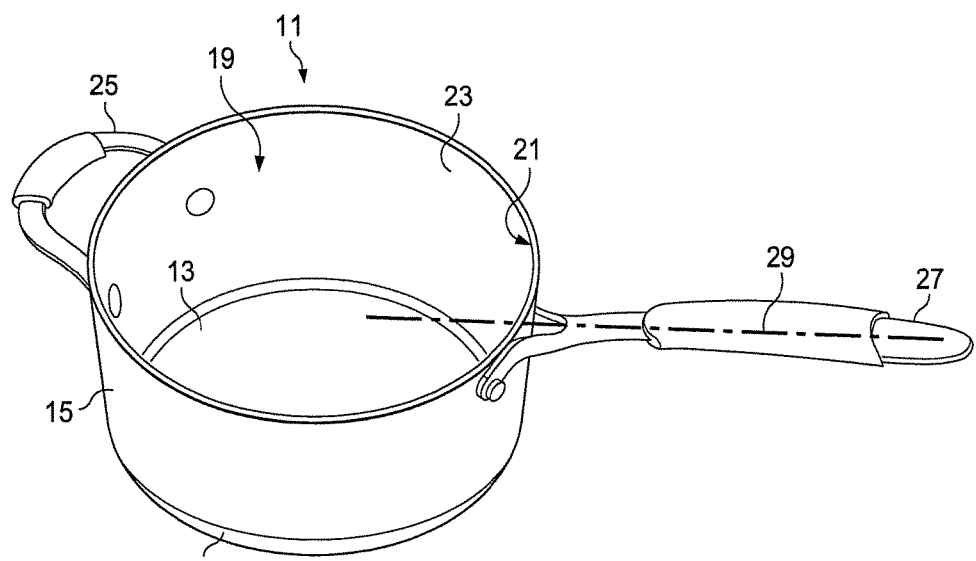
FIG. 1 is a view of a prior art item of cookware, namely a saucepan, having traditional, oppositely arranged handles.

FIG. 1 shows a traditional item of cookware, namely a saucepan 11. The saucepan 11 has a base 13 and a surrounding vertically upstanding sidewall 15 which extends vertically upward from an outer periphery 17 of the base to define an initially open interior space 19 and a top opening 21 of the container. The vertically upstanding sidewall has an inner wall surface 23 and an oppositely arranged outer wall surface.

The traditional cookware container shown in FIG. 1 has a first clasp handle 25 which is affixed to and extends outwardly from the outer wall of the container 11 adjacent the top opening 21 thereof which is configured to be held by a user. The container also has a second, oppositely arranged elongate handle 27 which extends outwardly from the outer wall of the container adjacent the top opening thereof, generally opposite the first, clasp handle. The second, elongate handle 27 is arranged generally perpendicular to the container sidewall. By "generally perpendicular to" is meant that the handle is arranged along an imaginary axis (29 in FIG. 1) approximately normal to the container sidewall.

The traditional item of cookware shown in FIG. 1 is well known in the cooking arts and is widely available from any of a number of commercial sources. However, the cookware container 11 has no utensil holding or support ability and the elongate handle 27 can sometimes cause inconveniences since the handles of several pots and pans can interfere with each other when all are present on a stovetop.

Figure 2:
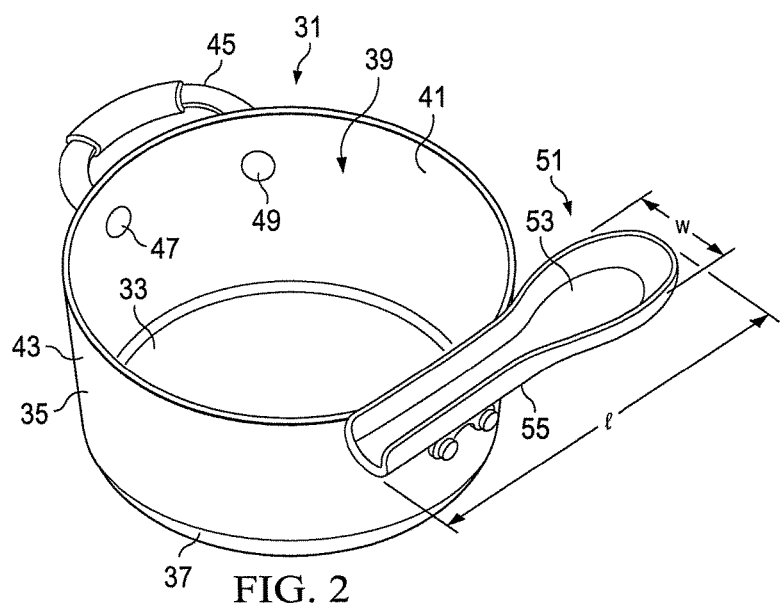
FIG. 2 is a perspective view of the item of cookware of the invention, showing the support handle thereof.

FIG. 2 shows an improved item of cookware of the invention, designated generally as 31. The saucepan 31 shown in FIG. 2 has the same basic pot configuration as has already been described with respect to FIG. 1 in having a base 33, an upstanding sidewall 35 having a periphery 37, the sidewall defining a top opening 39 for the container. The sidewall has an inner wall surface 41 and an outer wall surface 43. The cookware container 31 shown in FIG. 2 also has a first clasp handle 45 extending outwardly from the outer wall surface 43 of the container adjacent the top opening 39 thereof which is configured to be held by a user. By a "clasp" type handle is meant a semi-circular or arcuate member with opposing ends 47, 49, the opposing ends being attached to the outer wall surface 43 of the cookware container. Alternatively, the clasp handle could be a solid element attached to the outer wall surface of the container adjacent the top opening thereof. In either case, however, the clasp handle fits relatively closely about the container outer wall surface, rather than extending longitudinally outward, as does the second handle 27 shown in FIG. 1.

As shown in FIG. 2, the cookware container 31 has a second, support handle 51 afixed to the container outer wall 43 and arranged generally opposite the clasp handle 45. The second, support handle 51 is configured to receive and support a cooking utensil, such as a soup spoon, while also serving as a companion handle to the clasp handle 45 when being held by the user. In other words, the user would grasp the clasp handle 45 on one side of the pot and grasp the support handle 51 on the opposite side of the pot in order to lift or change the position of the pot on a stovetop or countertop. The support handle 51 has a length ("l" in FIG. 2) and a maximum width "w." Neither the maximum width "w" of the second support handle, or the clasp handle 45 extends outwardly from the container outer wall surface more than a distance of about one inch to about three and one half inches, whereas the traditional handle 27 shown in FIG. 1 extends outwardly along its longitudinal axis 29 for a distance on the order of seven and one half inches. This makes the improved cookware item of the invention much less likely to interfere with other pots and pans which may be present. The overall "footprint" of the improved cookware container 31 is much smaller than that of the traditional saucepan 11 shown in FIG. 1.

Figure 3:
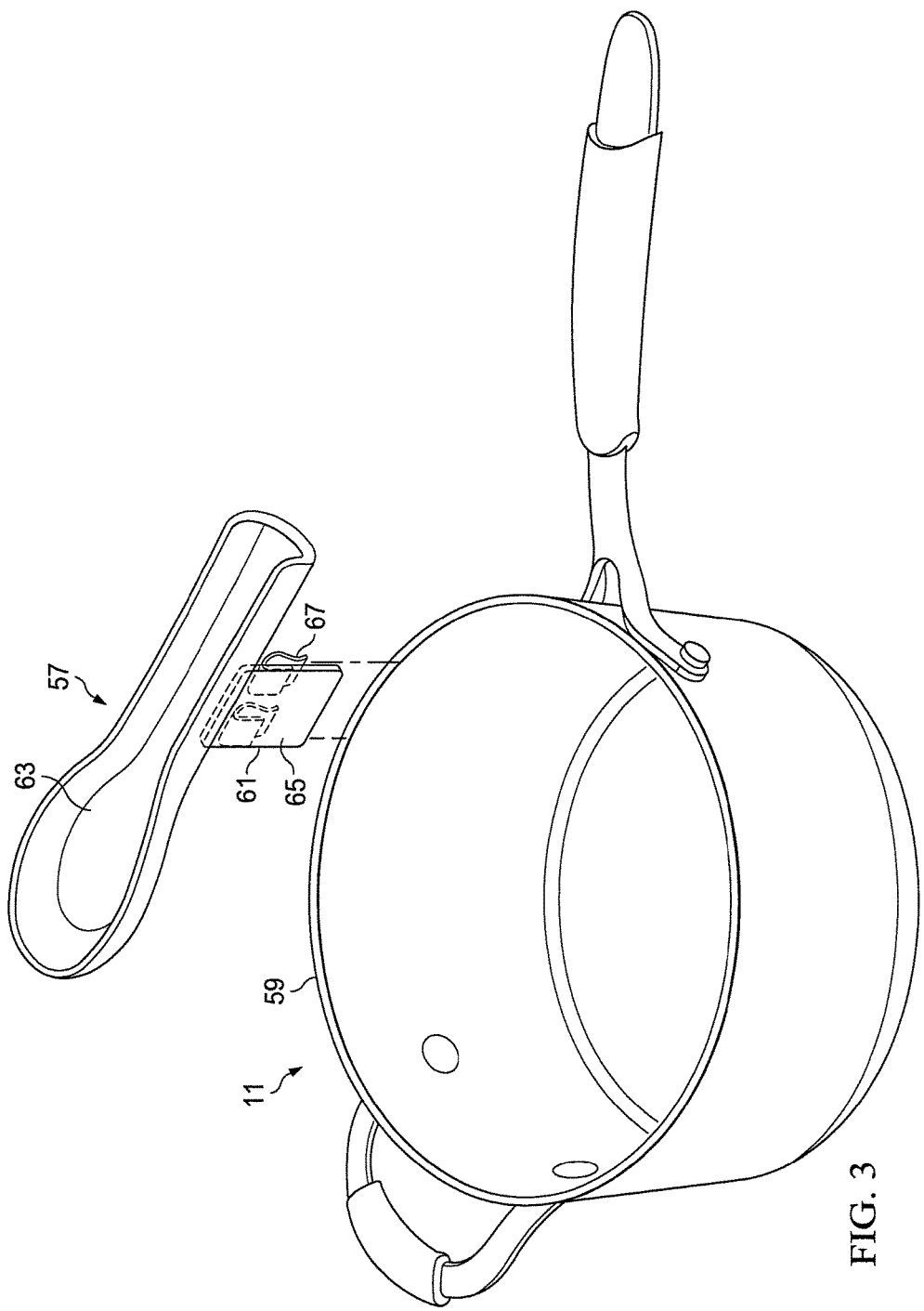
FIG. 3 is a view of another version of the invention in which the utensil support member is removably positioned on the peripheral top lip of a traditional item of cookware.
Figure 3A:
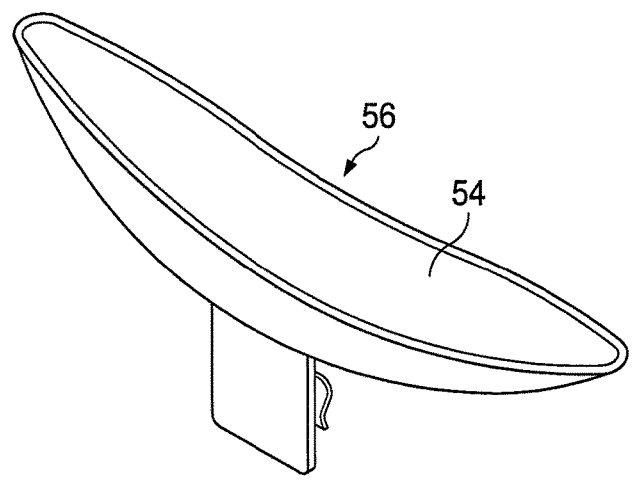
FIG. 3A shows a canoe-shaped spoon receiving support member which can be removable or permanently affixed to the sidewall of the item of cookware.
Figure 3B:
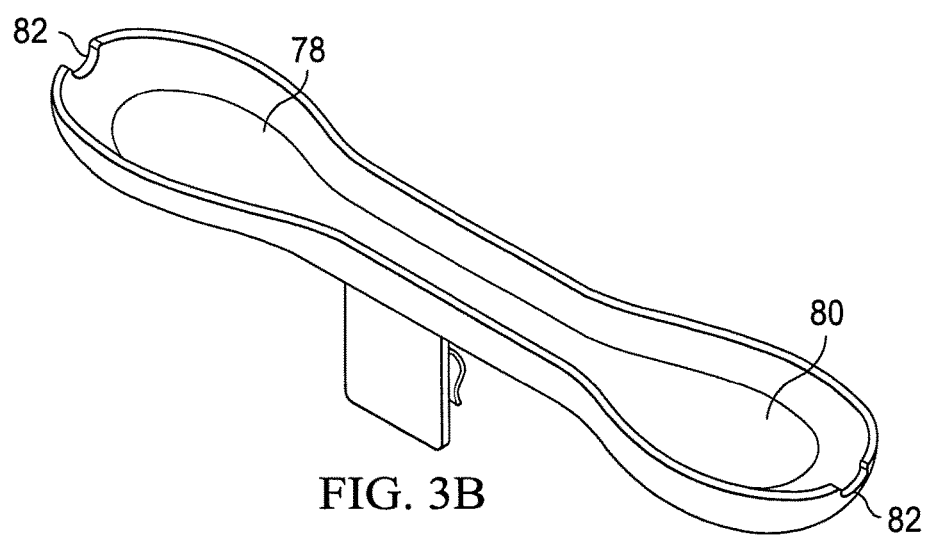
FIG. 3B shows a double-ended spoon receiving support member to accommodate left or right handed users.

As will be appreciated from FIG. 2, the second, support handle 51 has an upper support surface 53 and an opposite lower surface 55. The length "l" of the support handle 51 is arranged in a lateral direction with respect to the sidewall 43 of the container, rather than at a right angle thereto. As a result, the support handle is oriented with respect to the outer wall surface of the cookware container so as to not interfere with the handles of other pots and pans which may be used on a stovetop in conjunction with the item of cookware of the invention. The upper surface 53 has a utensil receiving recess formed therein. Although the recess might take various shapes, the preferred shape is that of a soup spoon with the recessed area being sized to receive at least a portion of the spoon in the spoon receiving recess. Another preferred utensil receiving recess might be the "canoe-shaped" recess 54 shown in the removable support member 56 of FIG. 3A. As shown in FIG. 3B, the support member might also be a double-ended spoon receiving recess having receiving areas 78, 80 for use by either a left or right handed user. The double ended support member shown in FIG. 3B has notches 82 at either end to receive a spoon handle. The recessed support surfaces 53 and 54 conveniently allow a user to support a cooking utensil, such as a soup spoon, on the support handle while cooking.

Figure 4:
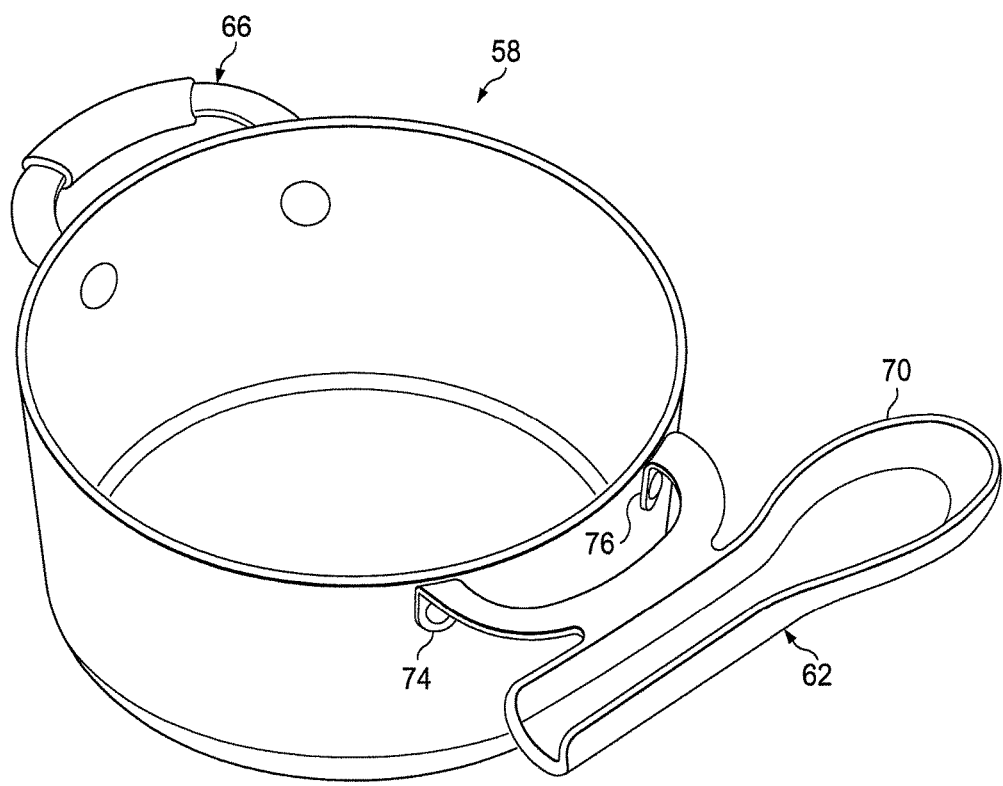
FIG. 4 shows another item of cookware, namely a sauce pan, with two oppositely arranged clasp handles, one of which has a spoon receiving support member formed therein.
Figure 5:
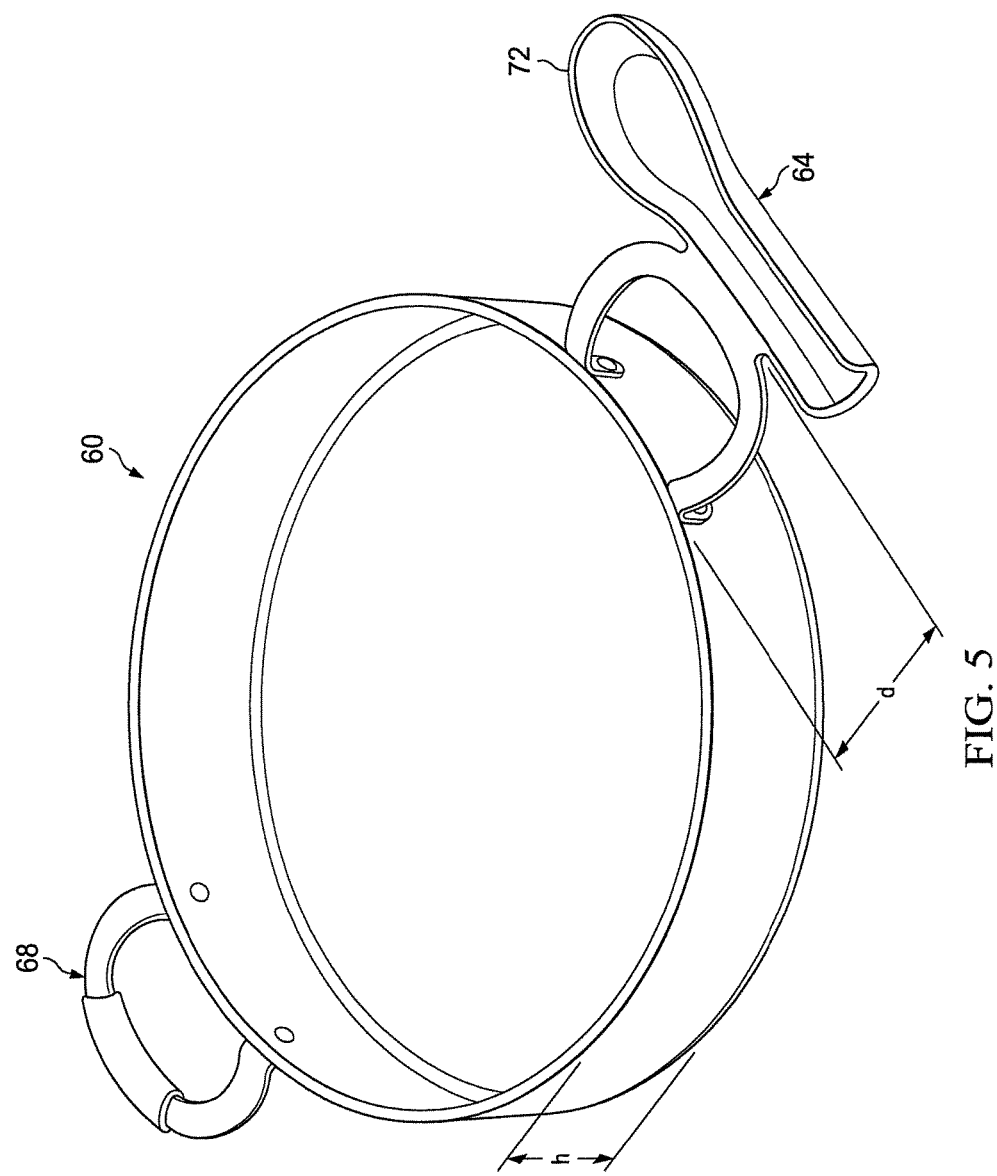
FIG. 5 shows a skillet having two oppositely arranged clasp handles, one of which includes the spoon receiving support member.

FIGS. 4 and 5 show another version of the item of cookware of the invention. The item in FIG. 4 is a saucepan 58 while the item shown in FIG. 5 is a skillet 60. Both of the items of cookware have a second clasp-shaped handle 62, 64 arranged oppositely from a first clasp-shaped handle 66, 68. However, in both cases, the second clasp handles 62, 64 have both been modified to incorporate a spoon-shaped support member 70, 72, which forms a part of the second clasp handle. Each spoon-shaped support member 70, 72, is located at an outer circumferential location on the clasp-shaped handle, spaced apart from the container sidewall, approximately mid way between the two handle attachment points (74, 76 in FIG. 4). Since the skillet sidewall depth or height ("h" in FIG. 5) is considerably less than that of the saucepan shown in FIG. 4, the spoon-shaped support member 72 is located further out from the container sidewall (indicated by the distance "d" in FIG. 5).

It will be appreciated that the improved item of cookware shown in FIGS. 2, 4 and 5 have the second support handle (such as support handle 51) permanently afixed to the outer wall surface of the container 31. This can be by welding, brazing, bradding, attaching by nuts and bolts or rivets, etc. With reference to FIG. 3, there is shown a traditional item of cookware 11 identical to that shown in FIG. 1. However, in this case, the traditional saucepan 11 has combined therewith a removable support member 57. The removable support member 57 is temporarily positionable on the peripheral lip 59 of the container by means of an attachment element 61 which extends from a lower surface of the support member. In this way, the support member 57 will again be supported with its length being arranged in a lateral direction with respect to the sidewall of the container, rather than at a right angle thereto. The support member 57 is otherwise identical to the previously described support handle 51. The upper surface is again provided with a utensil receiving recess 63 formed therein.

The attachment element 61 can assume various shapes, but in the case shown in FIG. 3 is a clip style member having a generally planar front surface 65 and rear clip elements 67. The clip is preferably made of a lightweight metal with the clip elements 67 having enough "bend" to allow the clip to be received in secure fashion on the peripheral lip 59 of the container. The remainder of the support member 57 will typically be formed of a suitable plastic, rubber or synthetic molded resin. The removable support member 57 shown in FIG. 3 offers the advantage of "retrofitting" existing cookware items with a utensil receiving feature.

An invention has been provided with several advantages. The support handle and member of the invention provide a convenient location to support a cooking utensil while cooking with a saucepan, pot, dutch oven or similar container. The support handle is simple in design and economical to manufacture. If desired, the support member alone can be retrofitted to an existing item of cookware. Alternatively, the cookware item can be a part of a set of cookware, with various items in the set all having the support handle permanently afixed. The utensil support surface avoids a messy cooking environment, as well as lessening the possibility of being accidently burned by a hot food item, such as soup or the like. The cooking utensil is always conveniently present on the cookware item being used.

While the invention has been shown in only two of its forms, it is not thus limited, but is susceptible to various changes and modifications without departing from the spirit thereof.

What is claimed is:

1. A cookware set, comprising:
a plurality of cookware containers each having a given weight and having a base and a surrounding vertically upstanding sidewall which extends vertically upward from an outer periphery of the base to define an initially open interior space and a top opening of the container, the sidewall having an outer wall surface and an inner wall surface;
a clasp handle permanently affixed to and extending outwardly from the outer wall surface of the container adjacent the top opening thereof which is configured to be held by a user while supporting the weight of the container;
a utensil support handle permanently affixed to the container outer wall surface and arranged generally opposite the clasp handle, the utensil support handle having a spoon-shaped support member incorporated therein which is configured to receive and support a cooking utensil while also serving as a companion handle to the clasp handle when being held by the user while supporting the weight of the container while lifting the container;
wherein the spoon-shaved support member has a length, a solid upper support surface which runs the length of the support member, and an opposite lower surface, the length of the spoon-shaped support member being arranged in a lateral direction with respect to the sidewall of the container, rather than at a right angle thereto, the upper surface of the spoon-shaved support member having a utensil receiving recess formed therein, the utensil receiving recess itself defining a flat, planar region with surrounding peripheral sidewalls running generally perpendicular thereto and which enclose the flat planar region in a spoon shaved outline and provide a solid recessed plane at a given depth with respect to the peripheral sidewalls;
wherein the solid recessed plane of the utensil receiving recess is located in a horizontal plane which is below the too opening of the container;
wherein the utensil support handle includes an arcuate-shaved member having oppositely arranged attachment points which loin the utensil support handle to the container sidewall, and wherein the spoon-shaped support member is incorporated at an outer circumferential location on the arcuate shaped member, in a horizontal plane below the top opening of the container, and spaced apart from the container sidewall to define a finger receiving opening with respect to the container sidewalls, approximately mid way between the two handle attachment points;
wherein the cookware container set includes various items in the cookware set all having the utensil support handle permanently affixed thereto; and
wherein the cookware set includes at least a saucepan and a skillet as a part of the cookware set, each of which has a given sidewall depth, and wherein the spoon-shaped support member for the skillet which is provided as a part of the cookware set is spaced apart a greater relative distance from the outer sidewall thereof than the spoon shaped support member for the saucepan which is provided as a part of the cookware set, the spacing being designed to facilitate a user's grasping the cookware container while supporting the weight of the container.

* * * * *